(12) United States Patent
Shibuno et al.

(10) Patent No.: US 9,769,378 B2
(45) Date of Patent: Sep. 19, 2017

(54) IMAGING APPARATUS THAT CHANGES FROM HIGHLIGHTING A FIRST FOCUS FRAME TO HIGHLIGHTING A SECOND FOCUS FRAME WHEN A FOCUS LENS MOVES FROM A FIRST FOCUS POSITION TO A SECOND FOCUS POSITION

(71) Applicant: Panasonic Intellectual Property Management Co., Ltd., Osaka (JP)

(72) Inventors: Koji Shibuno, Osaka (JP); Yusuke Obata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/843,386

(22) Filed: Sep. 2, 2015

(65) Prior Publication Data

US 2016/0073012 A1 Mar. 10, 2016

(30) Foreign Application Priority Data

Sep. 8, 2014 (JP) ................................ 2014-181935
Jun. 18, 2015 (JP) ................................ 2015-122870

(51) Int. Cl.
*H04N 5/232* (2006.01)
*H04N 5/235* (2006.01)

(52) U.S. Cl.
CPC ....... *H04N 5/23222* (2013.01); *H04N 5/2356* (2013.01); *H04N 5/23212* (2013.01); *H04N 5/23293* (2013.01)

(58) Field of Classification Search
CPC .......... H04N 5/23222; H04N 5/23212; H04N 5/23293; H04N 5/2356
See application file for complete search history.

(56) References Cited

U.S. PATENT DOCUMENTS

| 8,237,849 B2* | 8/2012 | Tanaka | G02B 7/08 348/348 |
| 8,629,914 B2* | 1/2014 | Kuriyama | G02B 7/36 348/222.1 |
| 2006/0104625 A1* | 5/2006 | Oya | G03B 15/16 396/153 |

(Continued)

FOREIGN PATENT DOCUMENTS

| JP | 2007-019685 | 1/2007 |
| JP | 2009-088722 | 4/2009 |

(Continued)

*Primary Examiner* — Nicholas Giles
(74) *Attorney, Agent, or Firm* — Wenderoth, Lind & Ponack, L.L.P.

(57) ABSTRACT

An imaging apparatus in the present disclosure includes an imaging unit for capturing an object image and generating image data, a focus lens for focusing the object image onto the imaging unit, an operation unit for receiving an instruction of a user, and a controller. The operation unit can set a first focus point and a second focus point that is different from the first focus point. The controller obtains information on a first focus position that is a position of the focus lens to focus on an object image at the first focus point and a second focus position that is a position of the focus lens to focus on an object image at the second focus point, before receiving from a user an instruction for capturing a moving image.

6 Claims, 12 Drawing Sheets

(56) References Cited

U.S. PATENT DOCUMENTS

| | | | |
|---|---|---|---|
| 2007/0018069 A1 | 1/2007 | Higashino | |
| 2008/0036902 A1* | 2/2008 | Tanaka | G02B 7/08 |
| | | | 348/353 |
| 2009/0041445 A1* | 2/2009 | Yoshida | G03B 13/32 |
| | | | 396/121 |
| 2011/0141334 A1* | 6/2011 | Kuriyama | G02B 7/36 |
| | | | 348/333.11 |
| 2013/0070145 A1* | 3/2013 | Matsuyama | H04N 5/23216 |
| | | | 348/333.12 |
| 2013/0188090 A1* | 7/2013 | Saito | H04N 5/23212 |
| | | | 348/345 |
| 2014/0139721 A1* | 5/2014 | Choi | H04N 5/23212 |
| | | | 348/345 |
| 2016/0050360 A1* | 2/2016 | Fisher | G03B 17/561 |
| | | | 348/207.11 |
| 2016/0142618 A1* | 5/2016 | Tokui | G02B 7/36 |
| | | | 348/349 |

FOREIGN PATENT DOCUMENTS

| | | |
|---|---|---|
| JP | 2009-118083 | 5/2009 |
| JP | 2013-068671 | 4/2013 |

* cited by examiner

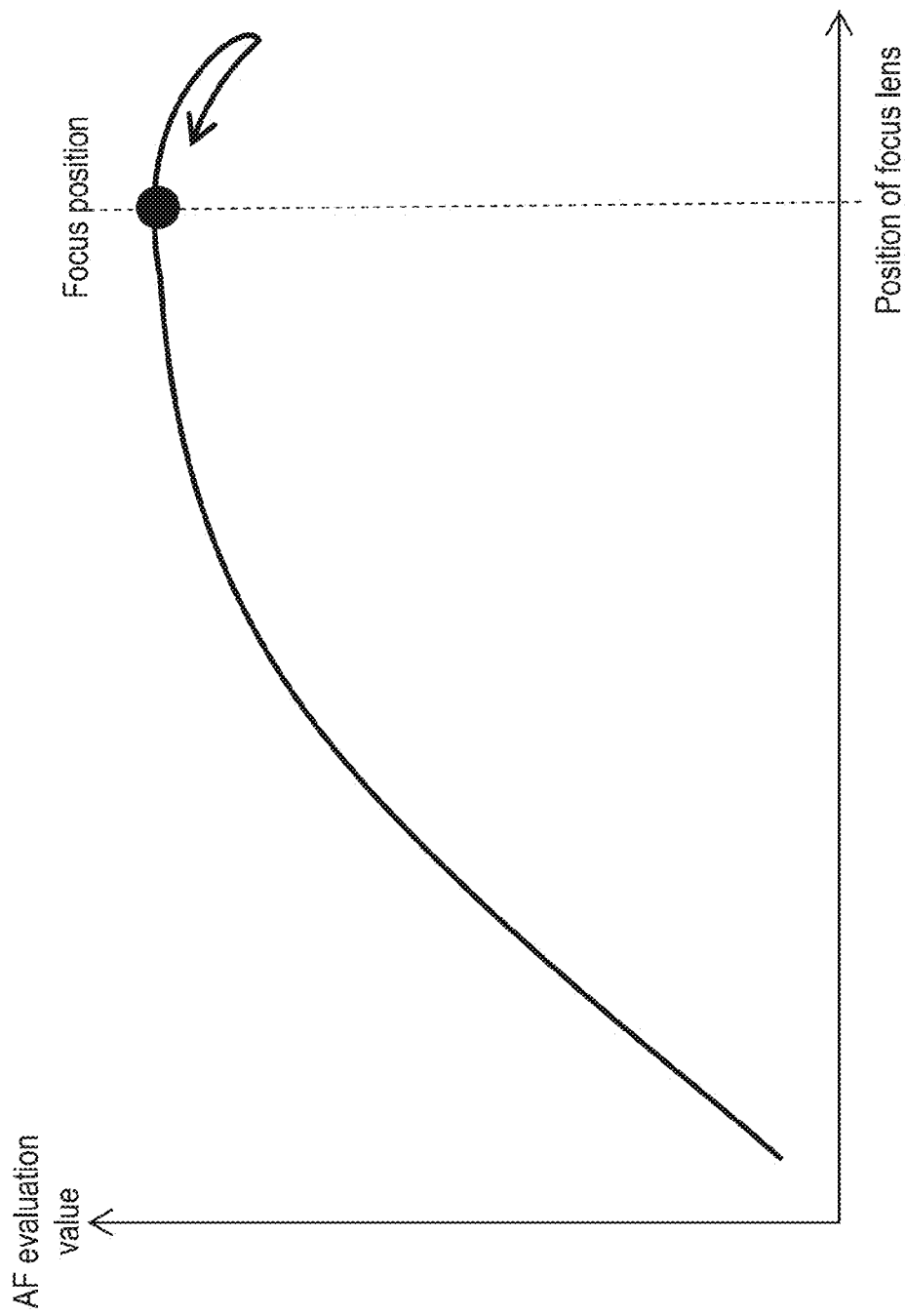

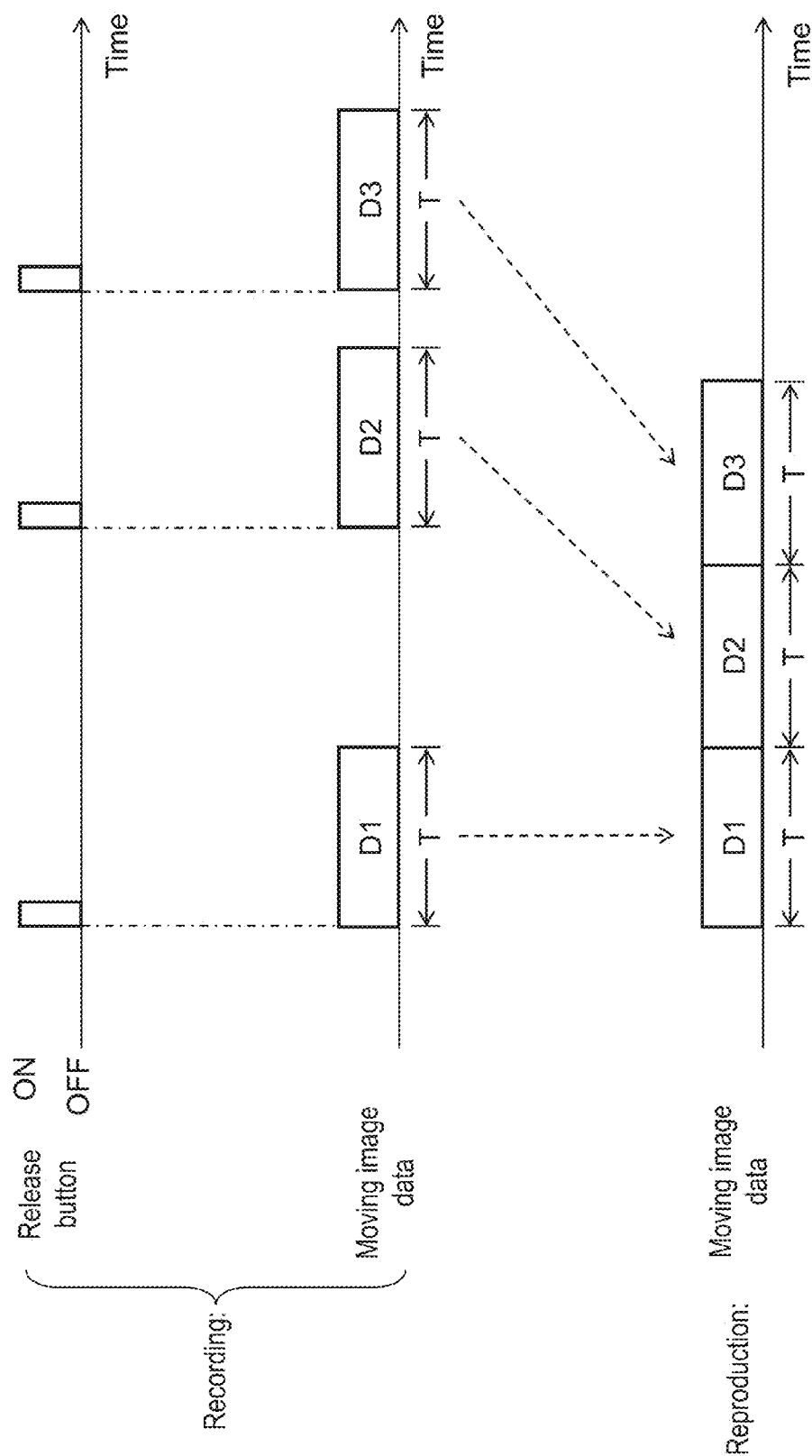

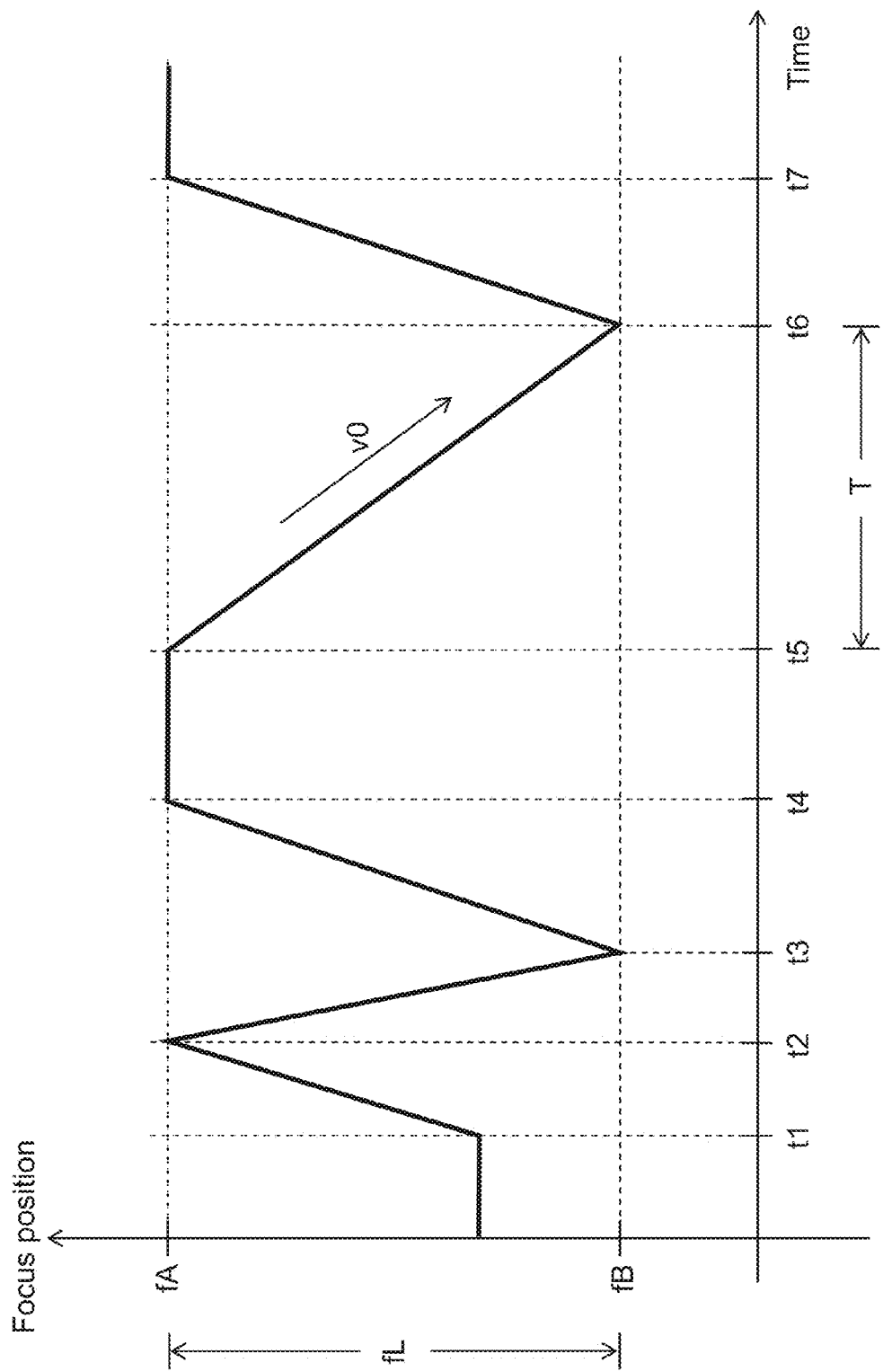

IMAGING APPARATUS THAT CHANGES FROM HIGHLIGHTING A FIRST FOCUS FRAME TO HIGHLIGHTING A SECOND FOCUS FRAME WHEN A FOCUS LENS MOVES FROM A FIRST FOCUS POSITION TO A SECOND FOCUS POSITION

BACKGROUND OF THE INVENTION

1. Field of the Invention

The present disclosure relates to an imaging apparatus that performs auto focusing control.

2. Description of the Related Art

PTL 1 discloses an imaging apparatus capable of adjusting a focus state of video being shot by a simple operation without missing an object being shot due to an operation of shifting a focus target.

CITATION LIST

Patent Literature

PTL 1: Unexamined Japanese Patent Publication No. 2013-068671

SUMMARY OF THE INVENTION

The present disclosure has an object of providing an imaging apparatus capable of adding a preferable rack focus effect to moving image data.

An imaging apparatus in the present disclosure includes an imaging unit for capturing an object image and generating image data, a focus lens for focusing the object image onto the imaging unit, an operation unit for receiving an instruction of a user, and a controller. The operation unit can set a first focus point and a second focus point that is different from the first focus point. The controller obtains information on a first focus position that is a position of the focus lens to focus on an object image at the first focus point and a second focus position that is a position of the focus lens to focus on an object image at the second focus point, before receiving from a user an instruction for capturing a moving image.

The imaging apparatus in the present disclosure allows for provision of an imaging apparatus capable of adding a preferable rack focus effect to moving image data.

BRIEF DESCRIPTION OF DRAWINGS

FIG. 4 is a schematic graph of auto focusing control of the digital camera according to the first exemplary embodiment;

FIG. 5 is an outline diagram of short-time moving images of the digital camera according to the first exemplary embodiment;

FIG. 7 is a graph showing movement of a focus lens according to the first exemplary embodiment;

DETAILED DESCRIPTION OF THE PREFERRED EMBODIMENTS

Hereinafter, embodiments will be described in detail with reference to the drawings as appropriate. However, unnecessarily detailed descriptions will not be provided. For example, detailed descriptions of well-known matters and redundant descriptions on substantially identical components will not be provided. This is to prevent the following descriptions from being unnecessarily redundant to facilitate the understanding of those skilled in the art.

The accompanying drawings and the following descriptions are provided for those skilled in the art to fully understand the present disclosure, and are not intended to limit a subject described in the claims.

First Exemplary Embodiment

[1-1. Configuration]

Hereinafter, a configuration of a digital camera will be described with reference to FIGS. 1 to 3. The digital camera is an example of an imaging apparatus.

Figure 1:
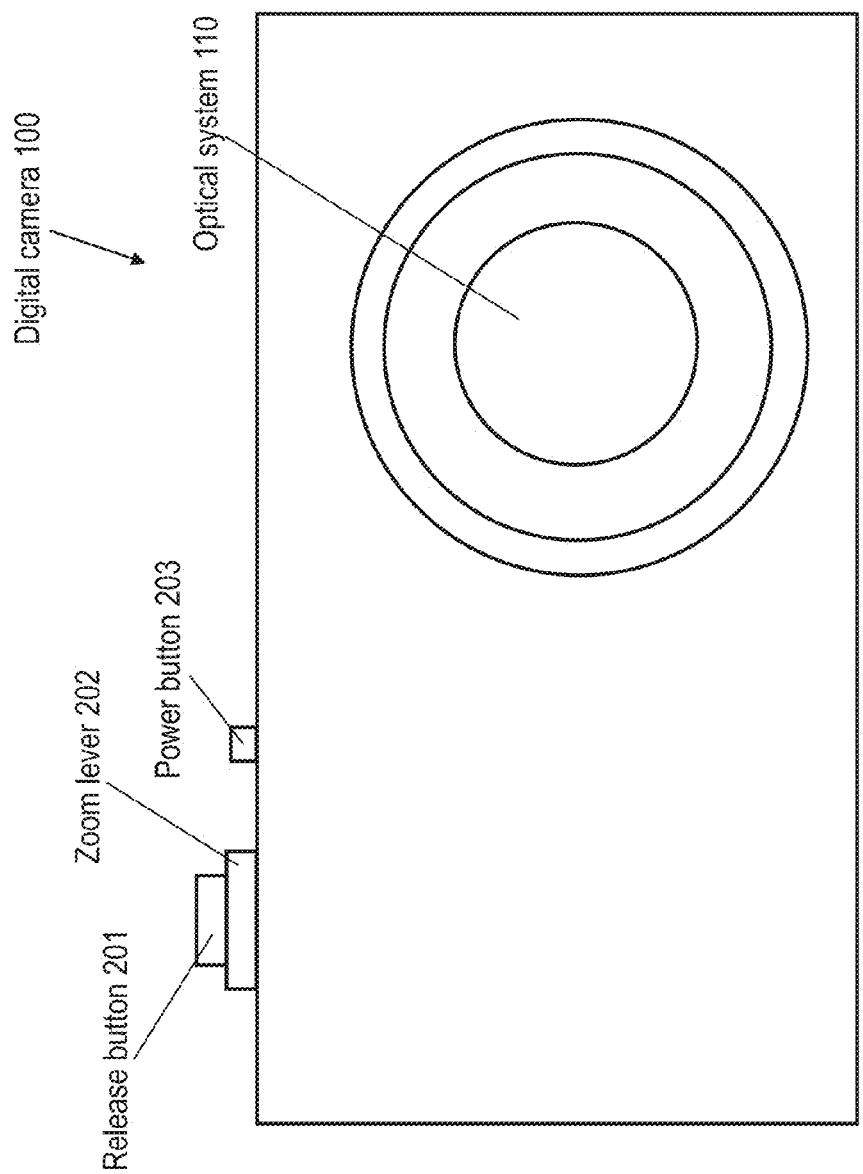
FIG. 1 is a front view of a digital camera according to a first exemplary embodiment.

FIG. 1 is a front view of digital camera 100. Digital camera 100 has a lens barrel housing optical system110 at the front. Digital camera 100 also has operation buttons on the top. The operation buttons include release button 201, zoom lever 202, and power button 203.

Figure 2:
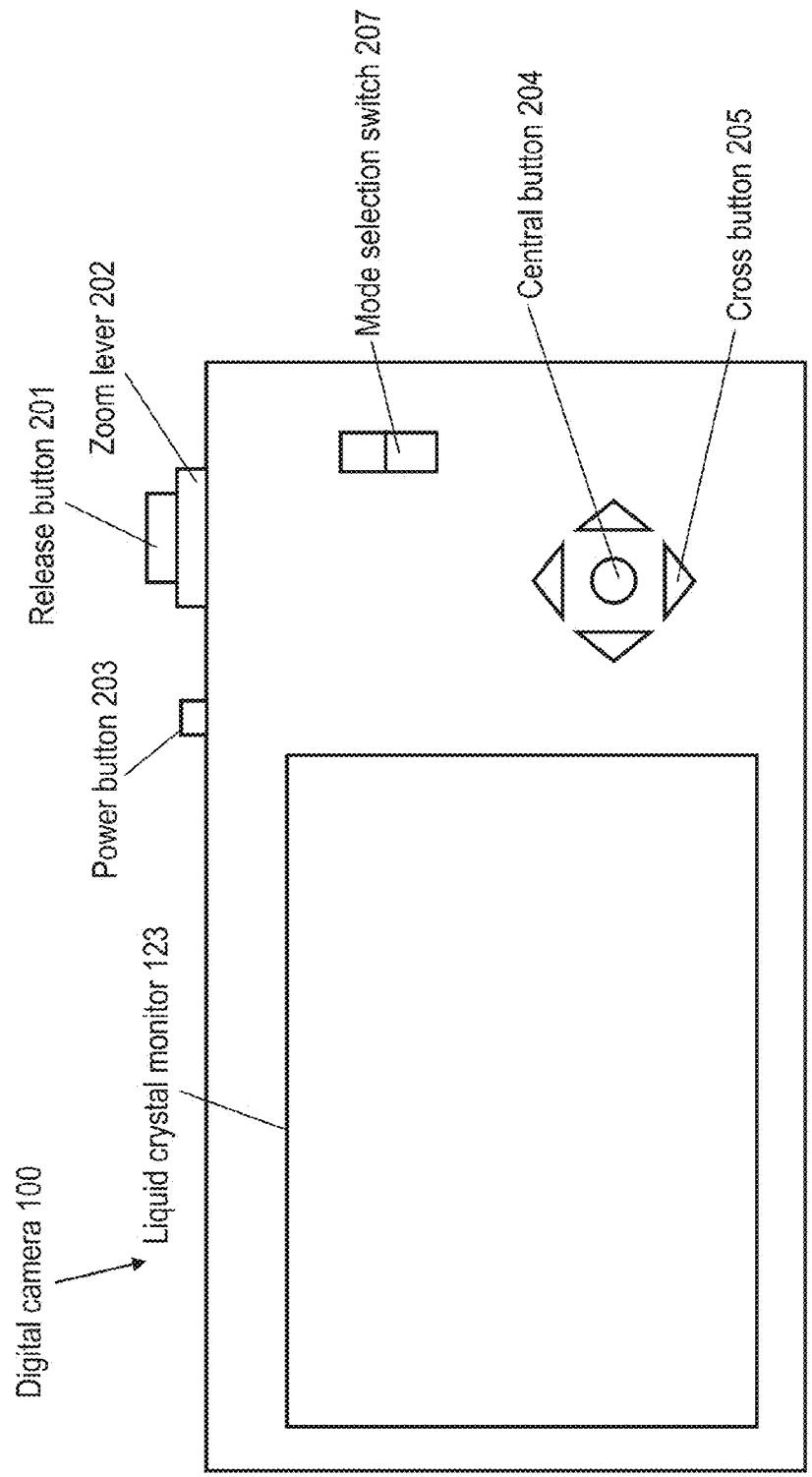
FIG. 2 is a back view of the digital camera according to the first exemplary embodiment.

FIG. 2 is a back view of digital camera 100. Digital camera 100 has liquid crystal monitor 123 at the back. Liquid crystal monitor 123 receives a touch operation by a user as described below. Digital camera 100 also has operation buttons at the back. The operation buttons include central button 204, cross button 205, and mode selection switch 207.

Figure 3:
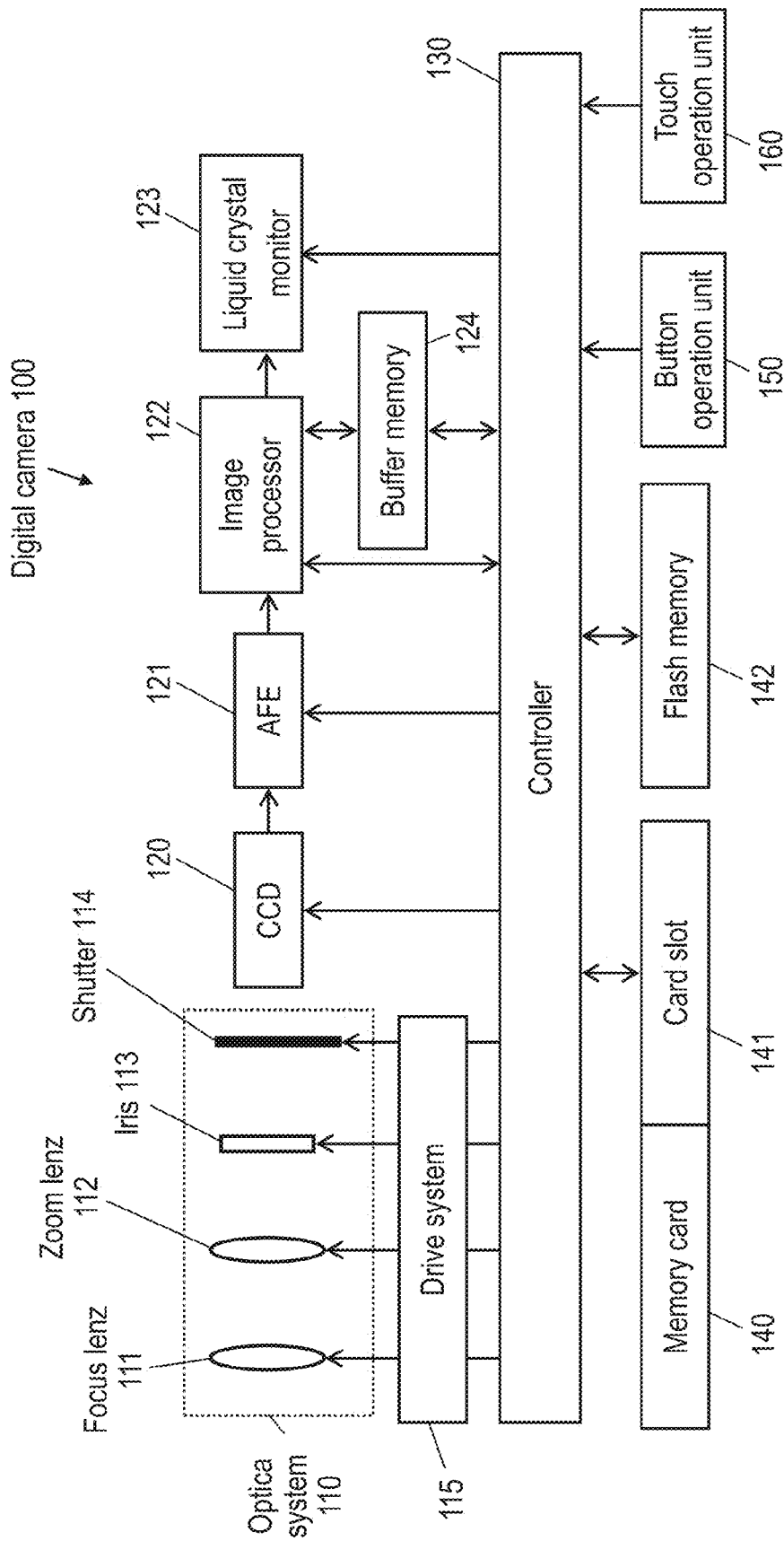
FIG. 3 is an electrical block diagram of the digital camera according to the first exemplary embodiment.

FIG. 3 is an electrical block diagram of digital camera 100. Digital camera 100 captures an object image formed through optical system110 with CCD (Charge-Coupled Device) image sensor 120. CCD image sensor 120 generates image data based on a captured object image. CCD image sensor 120 is an example of an imaging unit. Image data generated by image capturing is subjected to various kinds of processing in AFE (Analog Front End) 121 and image processor 122. Generated image data is recorded in flash memory 142 or memory card 140. Image data recorded in flash memory 142 or memory card 140 is displayed on liquid crystal monitor 123 upon reception of an operation of button operation unit 150 or touch operation unit 160 by a user. Details of components shown in FIGS. 1 to 3 will be described below.

Optical system 110 includes focus lens 111, zoom lens 112, iris 113, shutter 114, or the like. Optical system110 may include an optical shake correction (OIS: Optical Image Stabilizer) lens not shown. Each type of lens constituting optical system110 may include any number of lenses or may include any number of groups.

Focus lens 111 is used for adjusting a focus state of an object image. Zoom lens 112 is used for adjusting an angle of view of an object. Iris 113 is used for adjusting an amount of light entering CCD image sensor 120. Shutter 114 adjusts an exposure time of light entering CCD image sensor 120.

Digital camera 100 also has a drive system 115 for driving optical system 110. Drive system 115 may include a DC motor, a stepping motor, or the like. Focus lens 111, zoom lens 112, iris 113, and shutter 114 have respective driving means in drive system 115. Optical system110 is driven by drive system 115 in accordance with a control signal communicated from controller 130.

CCD image sensor 120 captures an object image formed through optical system110 to generate image data. CCD image sensor 120 can generate a new frame of image data at regular time intervals when digital camera 100 is in an image capturing mode.

AFE 121 processes image data read from CCD image sensor 120 to convert the image data into a digital signal. AFE 121 performs, on the image data, noise suppression by correlated double sampling, amplification to an input range width of an A/D converter by an analog gain controller, and A/D conversion by the A/D converter. Thereafter, AFE 121 outputs the image data converted into a digital signal to image processor 122.

Image processor 122 performs various kinds of processing on the image data output from AFE 121. The various kinds of processing include smear correction, white balance correction, gamma correction, YC conversion processing, electronic zoom processing, compression processing, expansion processing, and the like, but are not limited to them. Image processor 122 stores image information subjected to the various kinds of processing in buffer memory 124. Image processor 122 may be configured with a hardwired electronic circuit or may be configured with a microcomputer using a program. Alternatively, image processor 122 may be configured with a single semiconductor chip together with controller 130 and others.

Liquid crystal monitor 123 is provided at the back of digital camera 100. Liquid crystal monitor 123 displays an image based on image data processed by image processor 122. Images displayed by liquid crystal monitor 123 include through images and recorded images. Through images are images of new frames of image data generated at regular time intervals by CCD image sensor 120 and displayed sequentially. When digital camera 100 is in the image capturing mode, image processor 122 generally generates a through image from image data generated by CCD image sensor 120. By seeing through images displayed on liquid crystal monitor 123, a user can shoot, while checking a composition of an object. Recorded images are images of high-pixel image data recorded in memory card 140 or the like reduced to low pixels to be displayed on liquid crystal monitor 123 when digital camera 100 is in a playback mode. High-pixel image data to be recorded in memory card 140 is generated by image processor 122 based on image data generated by CCD image sensor 120 after an operation of release button 201 by a user is received. Liquid crystal monitor 123 is an example of a displaying unit.

Controller 130 performs centralized control of an operation of entire digital camera 100. Controller 130 records image data processed by image processor 122 and then stored in buffer memory 124 in a recording medium such as memory card 140. Controller 130 includes a ROM (Read Only Memory) for storing information such as programs, a CPU (Central Processing Unit) for processing various kinds of information by executing a program, and others. ROM stores programs for file control, auto focusing (AF) control, auto exposure (AE) control, and flash emission control, as well as a program for centralized control of the operation of entire digital camera 100.

Controller 130 may be configured with a hardwired electronic circuit, or may be configured with a microcomputer. Alternatively, controller 130 may be configured with a single semiconductor chip together with image processor 122 and others. ROM does not need to be an internal component of controller 130, and may be provided outside controller 130.

Buffer memory 124 is storage means functioning as a work memory of image processor 122 and controller 130. Buffer memory 124 can be implemented by DRAM (Dynamic Random Access Memory) or the like. Flash memory 142 functions as an internal memory for recording image data, setting information on digital camera 100, and so on.

Card slot 141 is connection means into which memory card 140 is removably inserted. To card slot 141, memory card 140 can be electrically and mechanically connected. Card slot 141 may have a function of controlling memory card 140.

Memory card 140 is an external memory having a recording unit such as flash memory inside. Memory card 140 can record data such as image data processed by image processor 122.

Button operation unit 150 is a generic name of an operation button and an operation dial provided on the exterior of digital camera 100, and receives an operation by a user. Button operation unit 150 includes release button 201, zoom lever 202, power button 203, central button 204, cross button 205, and mode selection switch 207. Upon receiving an operation by a user, button operation unit 150 notifies controller 130 of various operation instruction signals.

Touch operation unit 160 is an operation system provided on liquid crystal monitor 123. When a user touches an icon or the like displayed on liquid crystal monitor 123, touch operation unit 160 notifies controller 130 of various operation instruction signals. When digital camera 100 is in the image capturing mode, a through image is displayed on liquid crystal monitor 123. A user can indicate a target of AF control by touching a point on which he or she wants to focus (focus point) on liquid crystal monitor 123.

Release button 201 is a push-down button in two stages, a half-push state and a full-push state. When release button 201 is half pushed by a user, controller 130 executes AF control and AE control to determine capturing conditions. When release button 201 is subsequently full pushed by the user, controller 130 performs capturing. Controller 130 records image data captured at a timing of the full-push in memory card 140 or the like as a still image. Hereinafter, when release button 201 is described simply as being pushed down, it means a full-push.

Zoom lever 202 is a lever of a central-position self-returning type for adjusting the angle of view between a wide angle end and a telephoto end. When operated by a user, zoom lever 202 notifies controller 130 of an operation instruction signal to drive zoom lens 112. Specifically, when zoom lever 202 is operated toward the wide angle end, controller 130 drives zoom lens 112 to capture an object at a wide angle. Likewise, when zoom lever 202 is operated toward the telephoto end, controller 130 drives zoom lens 112 to capture an object at a telephoto.

Power button 203 is a push-down button for turning ON/OFF power supply to components constituting digital camera 100. When power button 203 is pushed down by a user when power is OFF, controller 130 supplies power to the components constituting digital camera 100 to start the components. When power button 203 is pushed down by a user when the power is ON, controller 130 stops power supply to the components.

Central button 204 is a push-down button. When central button 204 is pushed down by a user while digital camera 100 is in the image capturing mode or the playback mode, controller 130 displays a menu screen on liquid crystal monitor 123. The menu screen is a screen for setting various conditions for image capturing/reproduction. Information set on the menu screen is recorded in flash memory 142. When pushed down while a setting item of the various conditions is selected, central button 204 functions as a determination button.

Cross button 205 is a push-down button provided in up, down, right, and left directions. By pushing down cross button 205 in one of the directions, a user can select an item of the various conditions displayed on liquid crystal monitor 123.

Mode selection switch 207 is a push-down button provided in up and down directions. By pushing down mode selection switch 207 in either direction, a user can switch digital camera 100 between the image capturing mode and the playback mode.

[1-2. Operation]

[1-2-1. AF operation]

In this exemplary embodiment, digital camera 100 uses a control method called contrast AF in AF control.

When digital camera 100 is in the image capturing mode, an object image captured through optical system110 is converted into image data by CCD image sensor 120. Then, the image data is passed through AFE 121 and image processor 122 to be displayed as a through image on liquid crystal monitor 123. A user sees the through image displayed on liquid crystal monitor 123 and determines the angle of view or the like. The user selects and touches a point on which she or he wants to focus on the through image displayed on liquid crystal monitor 123. Touch operation unit 160 determines the point touched by the user to notify controller 130 of the point. Controller 130 performs contrast AF described below on the point that controller 130 is notified of by touch operation unit 160.

Contrast AF is executed based on AF evaluation values that are calculated every time image data is generated. An AF evaluation value is obtained by integrating a high-frequency component of a luminance signal that constitutes image data. An AF evaluation value is also called a contrast value. By comparing AF evaluation values calculated, controller 130 determines a direction to move focus lens 111 and a focus state of an object image. In one-point AF control, control is performed so that an AF evaluation value at a point specified by a user becomes the highest.

FIG. 4 is a basic operation explanatory diagram of contrast AF control. A focus lens motor included in drive system 115 continues to drive focus lens 111 in one direction from an infinite end or a near end. Controller 130 continues to calculate an AF evaluation value periodically in accordance with driving of focus lens 111. The focus lens motor continues to drive focus lens 111 in one direction as long as the AF evaluation value continues to rise. When the AF evaluation value stops rising and starts falling, controller 130 determines that focus lens 111 has passed through a position to focus image data (focus position). The focus lens motor drives focus lens 111 in a direction opposite to a direction up to that time to move focus lens 111 to the focus position, which is a position of focus lens 111 when the AF evaluation value becomes the highest. Upon receiving a half-push operation of release button 201 by a user, controller 130 executes an AF operation. When focus lens 111 moves to a focus position after the AF operation, controller 130 fixes focus lens 111 at the focus position. Thus, digital camera 100 has a function as a focus adjuster for adjusting a focus state of image data by driving focus lens 111 and calculating an AF evaluation value.

When the user performs a full-push operation on release button 201, controller 130 captures an object image and records the object image in memory card 140 or flash memory 142. Thus, digital camera 100 can capture an image focused on at a point intended by a user.

[1-2-2. Outline of Short-time Moving Image]

Digital camera 100 according to this exemplary embodiment can capture short-time moving images for a predetermined period of time, and reproduce the short-time moving images consecutively. Digital camera 100 can also automatically perform rack focus by changing a focus position while capturing short-time moving images.

FIG. 5 is an outline diagram of short-time moving images of digital camera 100. In recording, when a user pushes down release button 201, digital camera 100 captures moving images for a T time, which is a predetermined moving image capturing time. When the user repeats moving image capturing, moving image data D1 to D3 of T time Ts are stored in digital camera 100.

In reproduction, when the user instructs digital camera 100 to reproduce the short-time moving images, digital camera 100 consecutively reproduces captured moving image data D1 to D3. By thus connecting and reproducing moving image data D1 to D3 of the short-time moving images in the order of capturing, creation of a story like a slide show can be easily performed.

Moving image data D1 to D3 may be stored as separate files to be reproduced sequentially in reproduction, or may be combined and stored when it is determined that the user has finished capturing of short-time moving images.

The moving image capturing time may be a predetermined period of time for digital camera 100, or may be a period of time that can be set freely by a user.

[1-2-3. Moving Image Capturing Preparation]

Next, a preparation operation for moving image capturing will be described.

To perform capturing of short-time moving images, a user operates button operation unit 150 or touch operation unit 160 to select a short-time moving image capturing mode. The user subsequently sets various capturing conditions in the short-time moving image capturing mode. The capturing conditions specifically include a capturing time of short-time moving images, a number of moving images to be captured, an effect to be interposed between short-time moving images, and so on. Here, assume that as a capturing condition, the user sets the capturing time of short-time moving images at a T time. The user can also select presence or absence of rack focus as a capturing condition.

Figure 6A:
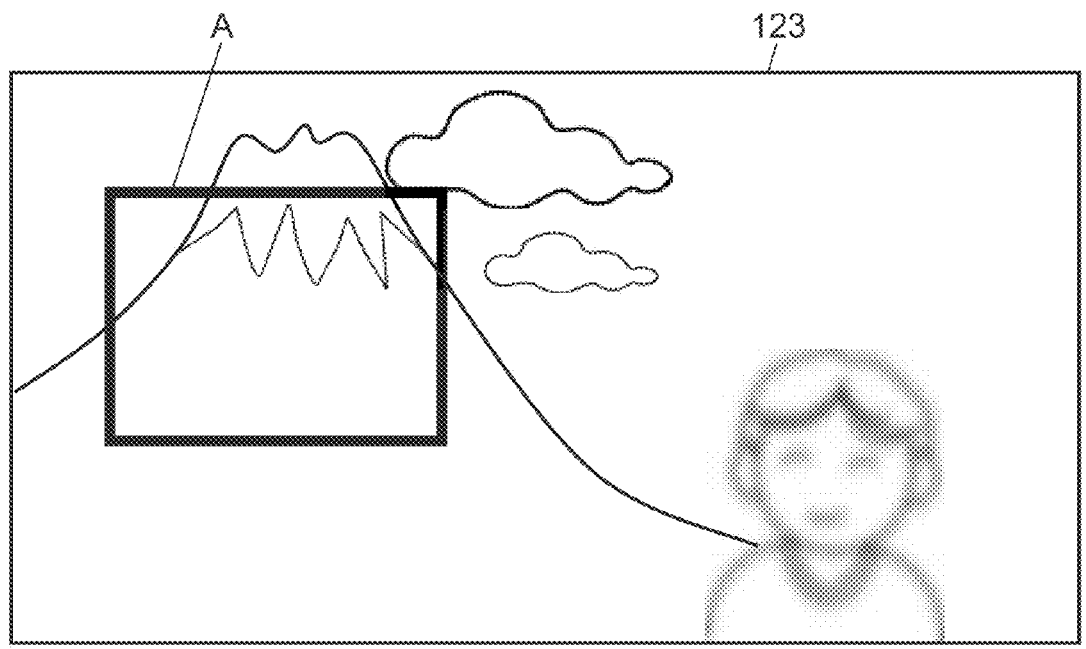
FIGS. 6A and 6B are diagrams illustrating a display of an AF frame selection of the digital camera according to the first exemplary embodiment.
Figure 6B:
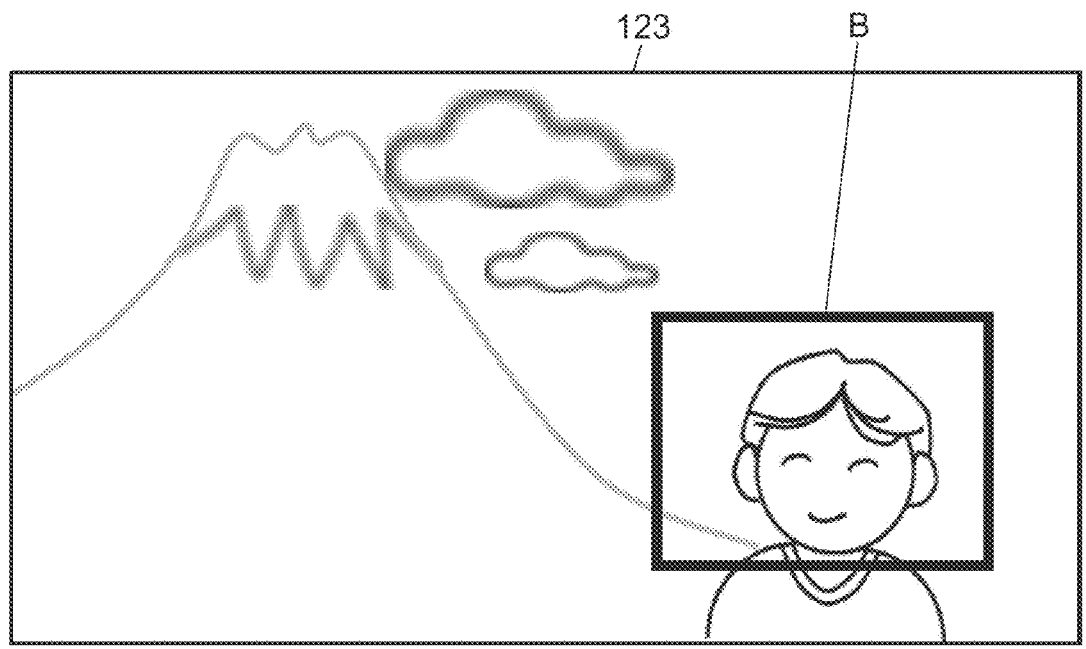

Rack focus will be described with reference to FIGS. 6A and 6B. FIGS. 6A and 6B are diagrams illustrating an example of a display on liquid crystal monitor 123. When the user selects rack focus as a capturing condition, he or she subsequently inputs AF frame A as a rack focus start point (FIG. 6A), and inputs AF frame B as a rack focus end point (FIG. 6B). The user can input AF frame A and AF frame B by touching object images displayed on liquid crystal monitor 123. Digital camera 100 drives focus lens 111 so that a focus point shifts from AF frame A to AF frame B while capturing short-time moving images. Here, assume that an object corresponding to AF frame A is located in a position farther from digital camera 100 than an object corresponding to AF frame B. AF frame A and AF frame B are an example of a focus frame.

[1-2-4. Moving Image Capturing Operation]

Figure 8:
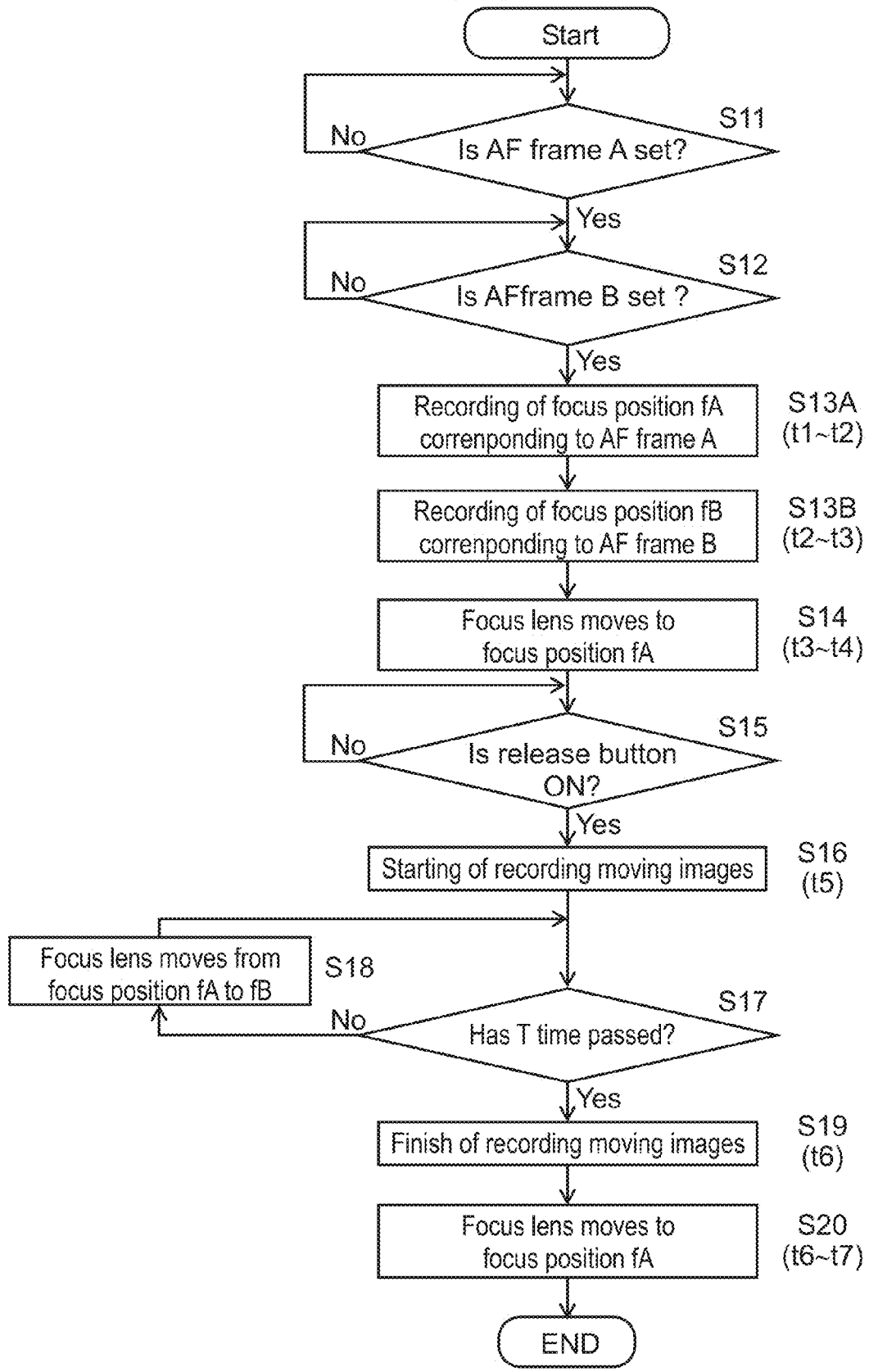
FIG. 8 is a flowchart of a rack focus operation according to the first exemplary embodiment.

Next, short-time moving image capturing involving rack focus will be described with reference to FIGS. 7 and 8.

FIG. 7 is a schematic graph of a drive locus of focus lens 111 during short-time moving image capturing. FIG. 8 is a flowchart in short-time moving image capturing. Times t1 to t7 shown in FIG. 7 correspond to times t1 to t7 shown in FIG. 8.

When a user selects the short-time moving image capturing mode including rack focus, digital camera 100 monitors whether AF frame A is input by the user or not (step S11).

When AF frame A is set by the user (Yes in step S11), digital camera 100 monitors whether AF frame B is input by the user or not (step S12).

When AF frame B is set by the user (Yes in step S12), controller 130 drives focus lens 111 via drive system 115 to focus on objects corresponding to AF frame A and AF frame B. Specifically, controller 130 first drives focus lens 111 via drive system 115 and calculates an AF evaluation value as shown in FIG. 4 described above, thereby adjusting a focus state of image data of the object corresponding to AF frame A and determining a position of focus lens 111 to focus on the object corresponding to AF frame A (focus position fA) (time t1 to t2 shown in FIG. 7). Then, controller 130 records focus position fA in flash memory 142 or the like (step S13A).

Controller 130 subsequently drives focus lens 111 via drive system 115 to focus on the object corresponding to AF frame B (time t2 to t3 shown in FIG. 7). When a position of focus lens 111 to focus on the object corresponding to AF frame B (focus position fB) is determined, controller 130 records focus position fB in flash memory 142 or the like (step S13B).

Next, controller 130 proceeds to step S14 to move focus lens 111 to focus position fA (time t3 to t4 shown in FIG. 7).

In the above-described example, controller 130 sequentially determines the positions of focus lens 111 to focus on the objects corresponding to AF frame A and AF frame B (focus positions fA, fB). However, when simultaneous distance measurements on a plurality of AF frames are possible, processing in steps S13A and S13B may be performed simultaneously.

Next, controller 130 proceeds to step S15 to monitor whether release button 201 is pushed down or not by the user.

When release button 201 is pushed down by the user (Yes in step S15), controller 130 starts recording moving images (step S16, time t5 shown in FIG. 7).

Upon starting recording of moving images, controller 130 records moving image data while moving focus lens 111 from focus position fA to focus position fB. In this case, digital camera 100 controls focus lens 111 to be driven at a constant velocity. That is, controller 130 drives focus lens 111 at velocity v0=(interval fL)/T, in which interval fL represents a distance from focus position fA to focus position fB, and a T time represents a moving image capturing time. At this time, controller 130 monitors whether a time of recording moving image data has passed the T time or not (step S17).

Controller 130 continues to record moving image data while moving focus lens 111 toward focus position fB at velocity v0 (step S18) until the time of recording moving image data reaches the T time (No in step S17).

When the time of recording moving image data reaches the T time (Yes in step S17), controller 130 finishes recording moving image data (step S19). At this time, focus lens 111 is located at focus position fB (t6 shown in FIG. 7) because focus lens 111 has been driven at constant velocity v0. Thus, focus lens 111 moves from focus position fA to focus position fB during the moving image capturing time.

When the recording of moving image data is finished, controller 130 moves focus lens 111 to focus position fA (step S20, t6 to t7 shown in FIG. 7). This is for a smooth shift to the next capturing when the user intends to capture images again in the same composition.

In the above description, an example of driving focus lens 111 at a constant velocity during recording of moving images has been described, but a method of driving focus lens 111 is not limited to this. A modification will be described with reference to FIG. 9.

Figure 9:
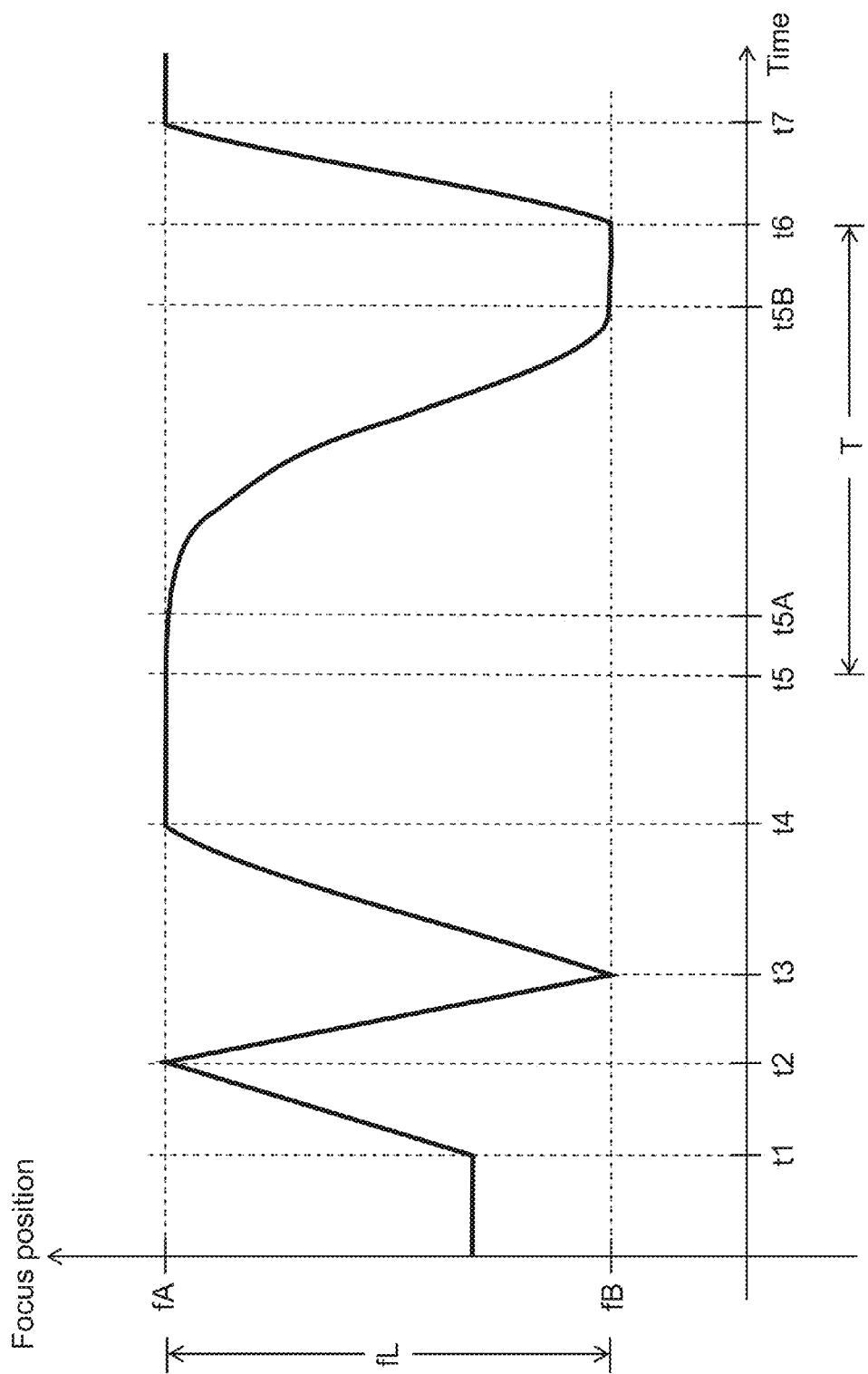
FIG. 9 is a graph showing movement of the focus lens according to the first exemplary embodiment.

FIG. 9 is a graph showing a modification of a method of driving focus lens 111. The modification shown in FIG. 9 is different than the example shown in FIG. 7 in a way of driving focus lens 111 in time t5 to t6 of the moving image capturing time.

After recording of moving image capturing is started (time t5) as shown in FIG. 9, controller 130 does not drive focus lens 111 from focus position fA for a predetermined period of time (time t5 to t5A). After a lapse of the predetermined period of time, controller 130 drives focus lens 111 toward focus position fB. At this time, controller 130 drives focus lens 111 so that focus lens 111 reaches focus position fB before the time of recording moving image data reaches the T time. After the focus lens 111 has reached focus position fB, controller 130 continues to record moving image data without driving focus lens 111 until the time of recording moving image data reaches the T time (time t5B to t6).

In an interval from time t5A to t5B in FIG. 9, controller 130 drives focus lens 111 at lower velocity in vicinities of focus position fA and focus position fB than in the other region when driving focus lens 111 from focus position fA to focus position fB. Specifically, focus lens 111 moves from focus position fA toward focus position fB while gradually increasing the velocity from time t5A, then decreases the velocity as focus lens 111 moves closer to focus position fB, and reaches focus position fB (time t5B).

By this control, digital camera 100 can ensure a long period of time for which focus lens 111 is located in the vicinities of focus position fA and focus position fB. Thus, digital camera 100 can ensure a long period of time to focus on objects that correspond to AF frame A and AF frame B specified by the user.

In the above modification, focus lens 111 stops at focus positions fA and fB for respective predetermined periods of time (time t5 to t5A and time t5B to t6). However, such stopping time does not necessarily need to be provided. Specifically, controller 130 may perform control to move focus lens 111 from focus position fA toward focus position fB while gradually increasing the velocity from time t5, and then decrease the velocity as focus lens 111 moves closer to focus position fB to cause focus lens 111 to reach focus position fB at time t6. In this case, it is preferable to drive focus lens 111 more slowly in the vicinity of focus position fB corresponding to an object that is nearer to digital camera 100. Since the object nearer to digital camera 100 is greatly changed in focus state on liquid crystal monitor 123 compared to a farther object, this control allows for a substantially equal degree of change in focus state of objects accompanying movement of focus lens 111, regardless of distances from digital camera 100.

The method of driving focus lens 111 during recording of moving image data is not limited to the above-described one. A method of driving focus lens 111 during recording of moving image data may be able to be set by a user as a capturing condition.

[1-2-5. Display Mode in Rack Focus Operation]

A display mode of liquid crystal monitor 123 in a rack focus operation will be described with reference to FIGS. 10A to 10C.

Digital camera 100 according to this exemplary embodiment can notify a user of a rack focus status by changing display modes of AF frame A and AF frame B during the time t5 to t6 shown in FIG. 7 or 9.

Figure 10A:
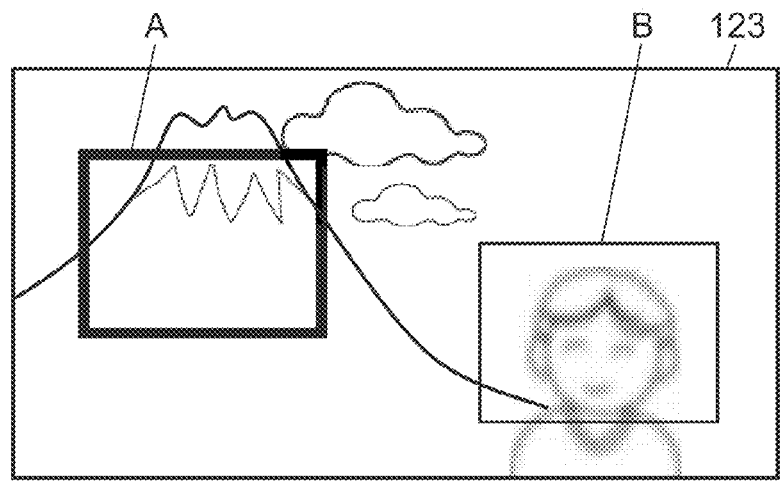
FIGS. 10A to 10C are diagrams illustrating a display of the rack focus operation according to the first exemplary embodiment.

FIG. 10A is a diagram illustrating an example of a display on liquid crystal monitor 123 when an object corresponding to AF frame A is in focus at the start of recording moving image data (time t5 shown in FIG. 7 or 9). At this time, focus lens 111 is located at focus position fA. As shown in FIG. 10A, when the object corresponding to AF frame A is in focus, AF frame A is highlighted compared to AF frame B. Specifically, AF frame A is displayed in a thicker line than AF frame B.

Figure 10B:
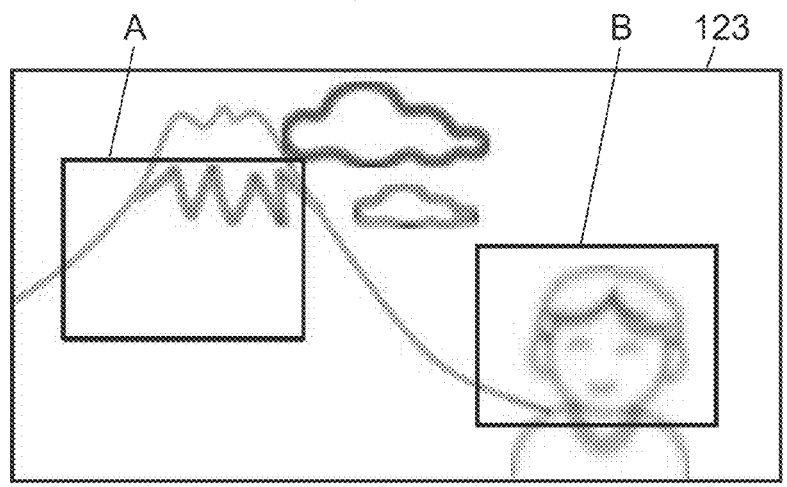

FIG. 10B is a diagram illustrating an example of a display on liquid crystal monitor 123 in the middle of recording moving image data (at or near a midpoint between time t5 and t6 shown in FIG. 7 or 9). At this time, focus lens 111 is located at or near a midpoint between focus position fA and focus position fB. As shown in FIG. 10B, when focus lens 111 is located at or near the midpoint between focus position fA and focus position fB, the display modes of AF frame A and AF frame B are substantially the same. Specifically, AF frame A and AF frame B are displayed in lines of almost equal thickness.

At this time, AF frame A shown in FIG. 10B is displayed in a thinner line than AF frame A shown in FIG. 10A, and AF frame B shown in FIG. 10B is displayed in a thicker line than AF frame B shown in FIG. 10A. That is, controller 130 changes the thicknesses of respective frames of AF frame A and AF frame B gradually in accordance with movement of focus lens 111.

Figure 10C:
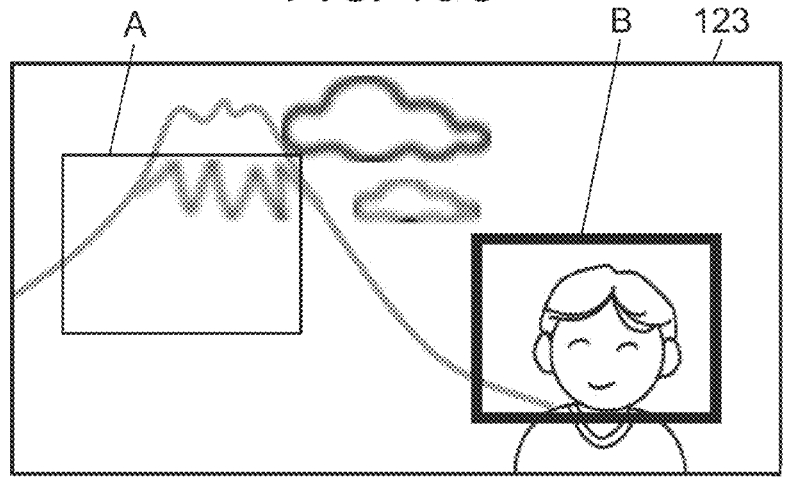

FIG. 10C is a diagram illustrating an example of a display on liquid crystal monitor 123 when an object corresponding to AF frame B is in focus at the end of recording moving image data (time t6 shown in FIG. 7 or 9). At this time, focus lens 111 is located at focus position fB. As shown in FIG. 10C, when the object corresponding to AF frame B is in focus, AF frame B is highlighted compared to AF frame A. Specifically, AF frame B is displayed in a thicker line than AF frame A.

At this time, AF frame A shown in FIG. 10C is displayed in a thinner line than AF frame A shown in FIG. 10B, and AF frame B shown in FIG. 10C is displayed in a thicker line than AF frame B shown in FIG. 10B. That is, controller 130 gradually changes the thicknesses of the respective frames of AF frame A and AF frame B in accordance with the movement of focus lens 111.

Thus, digital camera 100 according to this exemplary embodiment changes the display modes of AF frame A and AF frame B in accordance with change in focus state. This allows a user to easily visually recognize a focus state during a rack focus operation.

In the above-described example, for highlighting AF frame A and AF frame B, control is performed to gradually change a thickness of a line forming a frame, but the present disclosure is not limited to this. A color of an AF frame may be changed smoothly according to change in focus state. For example, an AF frame in focus may be displayed in green and a frame out of focus in white, and the colors of the AF frames may be changed gradationally while the focus state is being changed.

[1-3. Effects]

As described above, digital camera 100 according to this exemplary embodiment can add a rack focus effect to moving image data during capturing of short-time moving images.

Digital camera 100 obtains focus information on AF frame A at the start of rack focus and AF frame B at the end before an image capturing instruction of a user. This configuration allows digital camera 100 to smoothly start recording of moving image data immediately after receiving an image capturing instruction by a user.

During an image capturing operation involving rack focus, digital camera 100 does not obtain focus information. This configuration allows digital camera 100 not to record, in moving image data, instability in focus state due to a returning operation of focus lens 111 when focus information is obtained.

Digital camera 100 changes a display mode of an AF frame during an image capturing operation involving rack focus. This configuration allows a user to easily visually recognize a focus state during a rack focus operation.

Second Exemplary Embodiment

Hereinafter, a second exemplary embodiment will be described with reference to FIGS. 11 and 12.

[2-1. Configuration]

Digital camera 200 according to the second exemplary embodiment can obtain focus information by calculating an object distance using phase difference AF, DFD (Depth From Defocus), or the like, instead of contrast AF. The other configuration of digital camera 200 is similar to that of digital camera 100 according to the first exemplary embodiment, and will not be described.

Phase difference AF is a method of determining a focus direction and amount from an interval between two images formed by light entering through a lens, split into two, and introduced into dedicated sensors (not shown).

DFD is a method of calculating a distance to an object by recognizing space from a plurality of images that have different focus points.

Phase difference AF and DFD are known arts, and thus will not be described in detail.

[2-2. Operation]

Digital camera 200 can grasp a distance to an object using the above-described phase difference AF or DFD. Therefore, digital camera 200 calculates distances to a plurality of objects and determines focus positions of focus lens 111 corresponding to the respective objects, based on the distances, without driving focus lens 111. Then, digital camera 200 can determine a driving velocity of focus lens 111 based on a relationship with a predetermined moving image capturing time to perform a rack focus operation.

Figure 11:
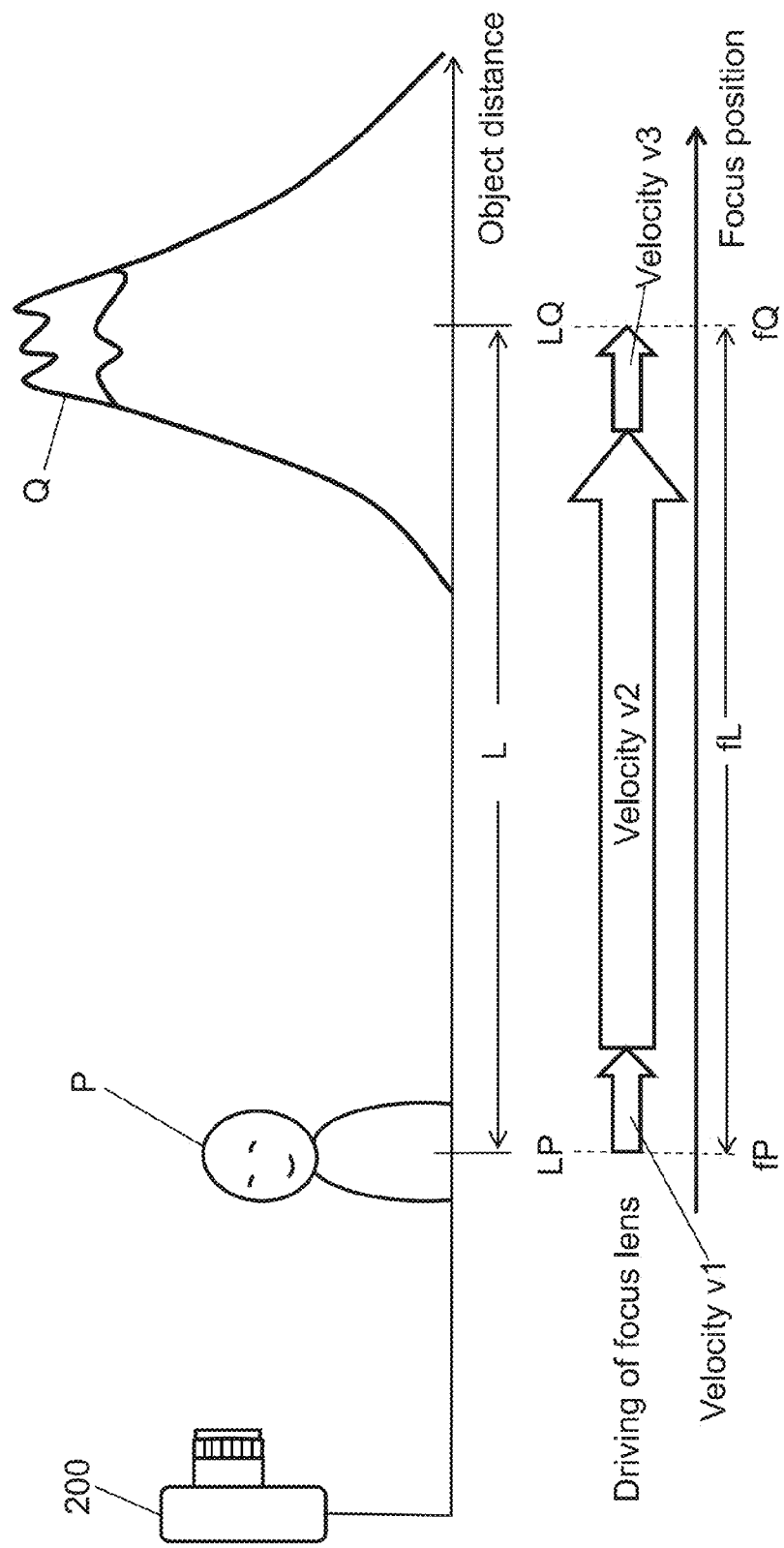
FIG. 11 is a diagram illustrating an outline of a rack focus operation according to a second exemplary embodiment.
Figure 12:
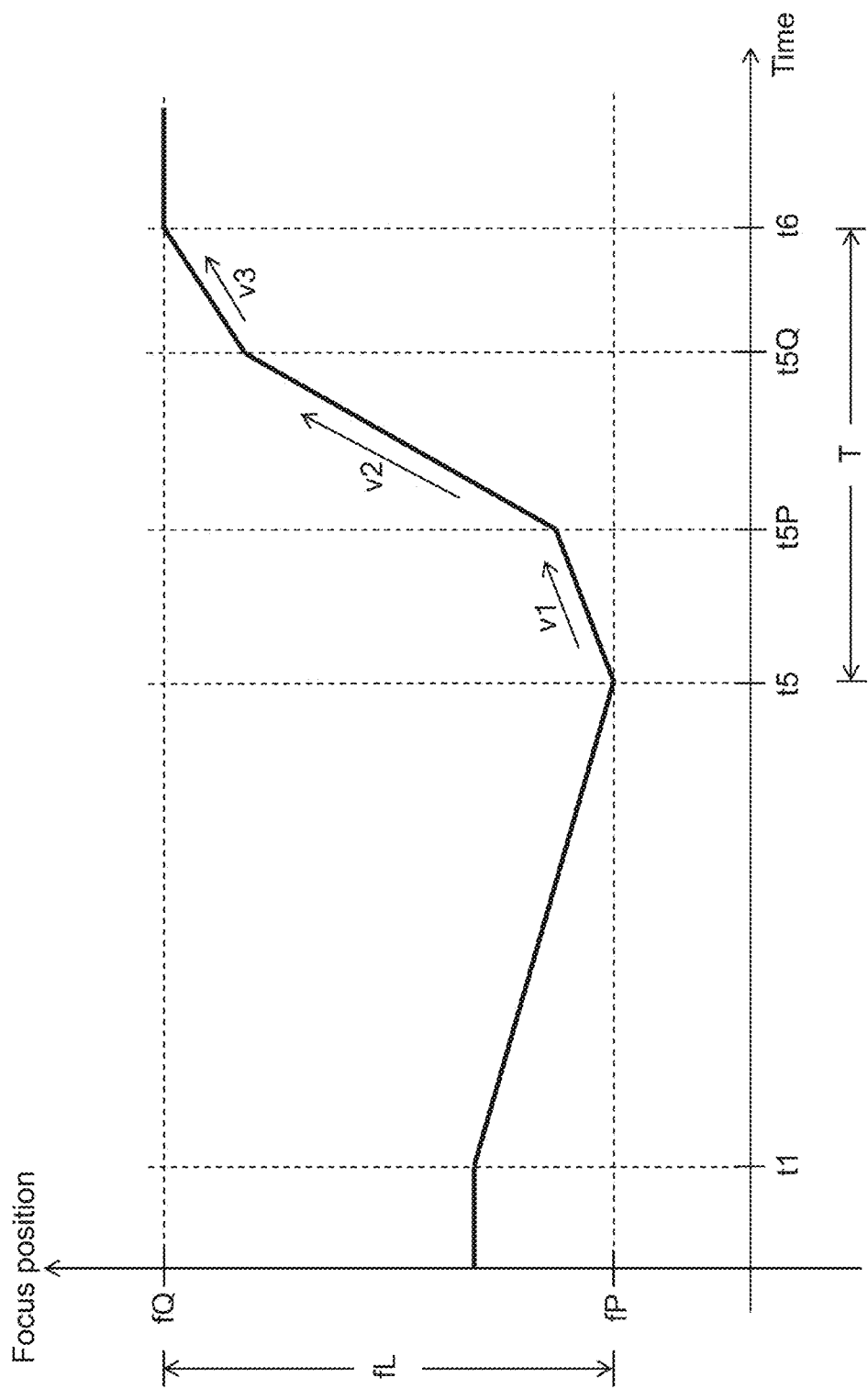
FIG. 12 is a graph showing movement of a focus lens according to the second exemplary embodiment.

FIG. 11 is a schematic diagram illustrating relationships between digital camera 200, object P, and object Q. When viewed from digital camera 200, object P is present at a nearer position than object Q. In this exemplary embodiment, a user selects object P as an object to be in focus at the start of a rack focus operation, and selects object Q as an object to be in focus at the end of the rack focus operation. Therefore, the user sets AF frame A at a point where object P is displayed, and then sets AF frame B at a point where object Q is displayed.

Digital camera 200 calculates distance LP and distance LQ to object P and object Q by phase difference AF or DFD before recording moving image data. At this time, digital camera 200 calculates focus positions fP and fQ of focus lens 111 to focus with respect to distances LP and LQ to the objects, respectively. As shown in FIG. 11, an inter-object distance L is a distance between objects P and Q, and interval fL is a distance between focus positions fP and fQ corresponding to inter-object distance L.

In this exemplary embodiment, distances to a plurality of objects can be measured simultaneously, and thus focus positions fP and fQ of focus lens 111 to focus on object P and object Q, respectively, can also be determined simultaneously. Therefore, processing corresponding to steps S13A and S13B can be performed simultaneously in the flowchart in FIG. 8 described in the first exemplary embodiment. When focus positions fP and fQ are determined, controller 130 can immediately move focus lens 111 to focus position fP.

Upon receiving from a user an instruction for capturing a moving image, digital camera 200 drives focus lens 111 from focus position fP to fQ, thereby implementing a rack focus operation. In this exemplary embodiment, movement of focus lens 111 from focus position fP to fQ is performed in three stages at velocities v1, v2, and v3.

Rack focus of digital camera 200 will be described specifically with reference to FIG. 12. When focus positions fP and fQ are calculated, digital camera 200 moves focus lens 111 to focus position fP that is a rack focus start position (t1 to t5 in FIG. 12). When focus lens 111 is located at focus position fP (t5 in FIG. 12), digital camera 200 focuses on object P. When an image capturing operation is started, controller 130 drives focus lens 111 at velocity v1 toward focus position fQ to focus on object Q (t5 to t5P in FIG. 12). After driving focus lens 111 at velocity v1 for a predetermined distance, controller 130 drives focus lens 111 at velocity V2 higher than velocity v1 toward focus position fQ (t5P to t5Q in FIG. 12). After driving focus lens 111 at velocity v2 for a predetermined distance, controller 130 drives focus lens 111 at velocity v3 lower than velocity v2 toward focus position fQ (t5Q to t6 in FIG. 12). Then, focus lens 111 reaches focus position fQ (t6 in FIG. 12).

At this time, the sum of the amount of driving at velocity v1, the amount of driving at velocity v2, and the amount of driving at velocity v3 is interval fL between focus position fP and focus position fQ. Velocity v1 and velocity v3 may be equal or different, but it is preferable to make velocity v1 in a vicinity of focus position fP corresponding to object P nearer to digital camera 200 lower. This is to make changes in focus state of objects P and Q substantially the same in view of the fact that an object nearer to digital camera 200 changes greatly in focus state on liquid crystal monitor 123 compared to a farther object.

The method of driving focus lens 111 during moving image data recording is not limited to the above-described example. Controller 130 may drive focus lens 111 from focus position fP to focus position fQ at a constant velocity, or may stop focus lens 111 at focus positions fP and fQ for a predetermined period of time. Alternatively, the method of driving focus lens 111 during moving image data recording may be able to be set by a user as a capturing condition.

[2-3. Effects]

As described above, digital camera 200 according to this exemplary embodiment can obtain focus information on a plurality of objects before moving image capturing without driving focus lens 111, and add a rack focus effect to moving image data in accordance with inter-object distance L during moving image capturing. This configuration allows digital camera 200 to speedily obtain focus information necessary for adding an effective rack focus effect to moving image data.

[3. Other Exemplary Embodiments]

As above, the first and second exemplary embodiments have been described as examples of technology disclosed in the present disclosure. However, the technology in the present disclosure is not limited to them, and can be applied to an exemplary embodiment in which change, replacement, addition, omission, or the like is made. It is also possible to combine components described in the above-described first and second exemplary embodiments to form a new exemplary embodiment. Then, other exemplary embodiments will be illustrated below.

In the first exemplary embodiment, a digital camera adds a rack focus effect according to a moving image capturing time of short-time moving image capturing, but the present disclosure is not limited to this. A digital camera only needs to add a rack focus effect by driving a focus lens for a predetermined period of time during moving image data recording. Specifically, a digital camera may be configured to add a rack focus effect by driving a focus lens for a predetermined period of time during moving image capturing, which is performed while a release button is being pushed. At this time, the predetermined period of time may be predetermined by the digital camera, or may be able to be set by a user.

In the first and second exemplary embodiments, a digital camera determines focus lens positions to focus on objects corresponding to AF frame A and AF frame B after a user finishes inputting AF frame A and AF frame B, but the present disclosure is not limited to this. Every time a user inputs an AF frame, a position of a focus lens to focus on the input AF frame may be determined. For example, when AF frame A is set in step S11 shown in FIG. 8, the process may proceed to step 13A, in which focus position fA corresponding to AF frame A is determined, and thereafter, when AF frame B is set (corresponding to step S12), the process may proceed to step 13B, in which focus position fB corresponding to AF frame B is determined.

In the first and second exemplary embodiments, a digital camera executes a rack focus operation on two AF frames input by a user, but the present disclosure is not limited to this. A user may input three or more AF frames, and rack focus operations on the input AF frames may be executed sequentially. It is only necessary that a user input two or more AF frames, and a rack focus operation be executed on the input AF frames.

INDUSTRIAL APPLICABILITY

The present disclosure is applicable to an imaging apparatus equipped with an auto focus function. Specifically, the present disclosure is applicable to a digital still camera, a movie, a cellular phone, a smartphone, a mobile PC, and so on.

What is claimed is:

1. An imaging apparatus comprising:
    an imaging unit for capturing an object image and generating image data;
    a focus lens for focusing the object image onto the imaging unit;
    an operation unit for receiving an instruction of a user;
    a displaying unit for displaying the image data; and
    a controller, wherein the operation unit is capable of setting a first focus point and a second focus point that is different from the first focus point, wherein the controller obtains information on a first focus position that is a position of the focus lens to focus on an object image at the first focus point and a second focus position that is a position of the focus lens to focus on an object image at the second focus point, before receiving from a user an instruction for capturing a moving image, and wherein the displaying unit, during capture of a moving image:

when the focus lens is at the first focus position, displays a first focus frame with a first characteristic, the first focus frame indicating the first focus point, and a second focus frame with a second characteristic that is different from the first characteristic, the second focus frame indicating the second focus point;

when the focus lens is at the second focus position, displays the first focus frame with the second characteristic and the second focus frame with the first characteristic; and when the focus lens is moving between the first focus position and the second focus position, displays the first focus frame and the second focus frame each with a characteristic that is different from both the first characteristic and the second characteristic.

2. The imaging apparatus according to claim 1, wherein the first characteristic is a first highlighting level and the second characteristic is a second highlighting level, the first highlighting level being greater than the second highlighting level, and when the focus lens is moving between the first focus position and the second focus position, the characteristic of the first focus frame and the characteristic of the second focus frame are highlighting levels that are greater than the second highlighting level and less than the first highlighting level.

3. The imaging apparatus according to claim 1, wherein the first characteristic is a first boldness level and the second characteristic is a second boldness level, the first boldness level being greater than the second boldness level, and when the focus lens is moving between the first focus position and the second focus position, the characteristic of the first focus frame and the characteristic of the second focus frame are boldness levels that are greater than the second boldness level and less than the first boldness level.

4. The imaging apparatus according to claim 1, wherein the first characteristic is a first line thickness and the second characteristic is a second line thickness, the first line thickness being greater than the second line thickness, and when the focus lens is moving between the first focus position and the second focus position, the characteristic of the first focus frame and the characteristic of the second focus frame are line thicknesses that are greater than the second line thickness and less than the first line thickness.

5. The imaging apparatus according to claim 1, wherein the first characteristic is a first color and the second characteristic is a second color that is different than the first color, and when the focus lens is moving between the first focus position and the second focus position, the characteristic of the first focus frame and the characteristic of the second focus frame are colors that are different than the first color and the second color.

6. The imaging apparatus according to claim 1, wherein when the focus lens is moving from the first focus position to the second focus position, the characteristic of the first focus frame transitions from the first characteristic to the second characteristic and the characteristic of the second focus frame transitions from the second characteristic to the first characteristic, and when the focus lens is moving from the second focus position to the first focus position, the characteristic of the first focus frame transitions from the second characteristic to the first characteristic and the characteristic of the second focus frame transitions from the first characteristic to the second characteristic.

* * * * *